US008662427B2

(12) United States Patent
Kerns et al.

(10) Patent No.: US 8,662,427 B2
(45) Date of Patent: *Mar. 4, 2014

(54) METHOD AND PROCESS FOR PROVIDING A CONTROLLED BATCH OF MICROMETER-SIZED OR NANOMETER-SIZED COAL MATERIAL

(76) Inventors: Kevin C. Kerns, Clarks Summit, PA (US); James R. Pagnotti, Old Forge, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/618,040

(22) Filed: Sep. 14, 2012

(65) Prior Publication Data

US 2013/0133247 A1 May 30, 2013

Related U.S. Application Data

(63) Continuation of application No. 12/724,538, filed on Mar. 16, 2010, now abandoned, which is a continuation of application No. 12/140,787, filed on Jun. 17, 2008, now Pat. No. 7,708,213, which is a continuation of application No. 11/318,262, filed on Dec. 23, 2005, now Pat. No. 7,407,121.

(60) Provisional application No. 60/639,498, filed on Dec. 28, 2004, provisional application No. 60/691,526, filed on Jun. 17, 2005.

(51) Int. Cl.
*B02C 17/00* (2006.01)

(52) U.S. Cl.
USPC ........................................................ 241/24.24

(58) Field of Classification Search
None
See application file for complete search history.

(56) References Cited

U.S. PATENT DOCUMENTS

| | | | |
|---|---|---|---|
| 4,045,092 | A | 8/1977 | Keller |
| 4,905,918 | A | 3/1990 | Selles et al. |
| 4,921,831 | A | 5/1990 | Kakai et al. |
| 5,071,820 | A | 12/1991 | Quinn et al. |
| 5,151,173 | A | 9/1992 | Vaughn et al. |
| 5,174,512 | A | 12/1992 | Orlandi |
| 5,575,824 | A | 11/1996 | Brown et al. |
| 5,732,894 | A | 3/1998 | Shealhan |
| 5,880,061 | A | 3/1999 | Yoshino et al. |
| 6,064,560 | A | 5/2000 | Hirhara et al. |
| 6,318,649 | B1 * | 11/2001 | Mazurkiewicz ................. 241/5 |
| 6,425,941 | B1 | 7/2002 | Roodman |

(Continued)

OTHER PUBLICATIONS

Activated Carbon Compendium; Marsh, H.; Elsevier Science Ltd., United Kingdom, 2001; pp. 121-175.

(Continued)

*Primary Examiner* — Robert R Raevis
(74) *Attorney, Agent, or Firm* — The Webb Law Firm

(57) ABSTRACT

A printing ink includes a micrometer-sized or nanometer-sized coal material. The micrometer-sized or nanometer-sized coal material is produced using a method of providing a controlled batch of micrometer-sized or nanometer-sized coal material. This method includes the steps of: (a) specifying at least one desired physical and/or chemical parameter of the controlled batch of coal material; (b) specifying the desired range of the physical and/or chemical parameter in the controlled batch of coal material; (c) obtaining a feedstock batch of coal material; and (d) processing a feedstock batch of coal material to obtain the controlled batch of coal material having the at least one specified physical and/or chemical parameter in the specified range thereof. In a further step, the controlled batch of coal material can be activated.

7 Claims, 8 Drawing Sheets

(56) References Cited

U.S. PATENT DOCUMENTS

| | | | |
|---|---|---|---|
| 6,824,086 B1 | 11/2004 | Mazurkiewicz et al. | |
| 7,407,121 B2 * | 8/2008 | Kerns et al. | 241/5 |
| 7,708,213 B2 * | 5/2010 | Kerns et al. | 241/5 |
| 2003/0132326 A1 | 7/2003 | Reeves et al. | |
| 2006/0112858 A1 | 6/2006 | Nguyen | |

OTHER PUBLICATIONS

Adsorption by Powders & Porous Solids; Rouquerol, F.; Rouquerol J.; and Sing, K.; Academic Press, New York 1999; pp. 98-102.

Carbon Materials for Advance Technologies; Burchell, T.D.; Elsevier Science Ltd., Netherlands, 1999; pp. 235-268.

Coal and Coal Related Compounds; Kabe, T.; Ishihars, A.; Qian, E.W.; Sutrisna, I.P.; Kabe, Y.; Kodansha, Ltd.; Tokyo, Japan 2004; pp. 1, 3, 4, 12, 18.

Coal Preparation, Leonard III, J.W. And Harding, B.C.; Society for Mining, Metallurgy, and Exploration, Inc., Colorado 1991; pp. 143-270.

Elements of Coal Preparation, The Pennsylvania State University, Pennsylvania 1994; Section 10 thru 14.

New Carbons, Control of Structure and Functions; Inagaki, M.; Elsevier Science Ltd., Netherlands, 2000; pp. 124-145, 101.

Particulate Science and Technology; Beddow, J.K.; Chemical Publishing Co., Inc., New York, 1980; pp. 14-15, 77-154.

Premium Carbon Products and Organic Chemicals from Coal; Song, C.; Schobert, H.H.; and Andresen, J.M.; IEA Clean Coal Centre, Gemini House, United Kingdom, 2005; pp. 50-61.

Prospects for Coal Science in the 21st Century, Shanxi Science & Technology Press, 1999; pp. 909-912.

Rocks and Minerals; Prinz M.; Harlow, G.; Peters, J.; Simon & Schuster, Inc., New York 1977; p. 347.

SME Mineral Processing Handbook; Weiss, N.L.; Society of Mining Engineers, New York 1985; pp. 3-1 thru 7-35.

Ultra-Fine Particles, Kuhn, W.E.; John Wiley & Sons, Inc.; New York, 1963; pp. 300-312.

Ahmadpour, C. and Do, D.D., "The Preparation of Active Carbons from Coal by Chemical and Physical Activation"; Carbon 1996, vol. 34, No. 4; pp. 471-479.

Andresen, J.M.; Burgess, C.E.; Pappano, P.J.; Schobert, H.A.; "New Directions for Non-fuel Uses of Anthracites", Fuel Processing Technology 2003; pp. 1373-1392.

Bessant, G.A.R. and Walker, P.L.; "Activation of Anthracite: Using Carbon Dioxide Versus Air", Carbon 1994; pp. 1171-1176.

Centeno, T.A. and Stoeckli, F.; "On the Activation of Asturian Anthracite following Various Pretreatments", Carbon 1994, pp. 1463-1467.

Daulin, C.; Lyubshik, S.B.; Ronzaud, J.N. and Beguin, F.; "Influence of Antracite Pretreatment in the Preparation of Activated Carbons", Fuel 1998, 77; pp. 495-502.

Gergova, K.; Esser, S.; and Schobert, H.H.; "Preparation and Characterization of Activated Carbons from Anthracite"; Energy & Fuels 1993; 7, pp. 661-668.

Kovacik, G.; Wong, B.; and Furimsky, E.; "Preparation of Activated Carbon from Western Canadian High Rank Coals", Fuel Processing Tech., 41, 1995; pp. 89-99.

Mazurkiewicz, Dr. M.; "Investigation of Ultra-Fine Coal Desintegration Effect by High Pressure Water Jet"; Rock Mechanics and Explosives Research Center, University of Missouri, 1986, 231-244.

Mufloz-Guillena, M.J.; Illan-Gomex, M.J.; Martin-Martinez, J.M.; Linares-Solano, A.; and Salinas-Martinez de Lecea, C.; "Activated Carbons from Spanish Coals. 1. Two-Stage CO2 Activation"; Energy & Fuels, 1992, vol. 6, No. 1; pp. 9-15.

Munroe, R.G.; Malghan, S.G.; and Hsu, S.M.; "Variances in the Measurement of Ceramic Powder Properties"; Journal of Research of the National Institute of Standards and Technology 1995; pp. 51-60.

Perrin, A.; Celzard, A.; Albiniak, A.; Jasienko-Halat, M.; Mareche, J.F.; and Furdin G.; "NaOH Activation of Anthracites: Effect of Hydroxide Content on Pore Textures and Methane Storage Ability"; Microporous and Mesoporous Materials 2005, 81; pp. 31-40.

Perrin, A.; Celzard, A.; Albiniak, A.; Jasienko-Halat, M.; Mareche, J.F.; and Furdin G.; "NaOH Activation of Anthracites: Effect of Temperature on Pore Textures and Methane Storage Ability"; Carbon 2004, 42; pp. 2855-2866.

Pis, J.J.; Parra, J.B.; Puente, G.; Rubiera, F.; and Pajares, J.A.; "Development of Macroporosity in Activated Carbons by Effect of Coal Preoxidation and Burn-Off", Fuel 1998; vol. 77, No. 6; pp. 625-630.

Hsu, Li-Yeh, Teng, H.S.; "Influence of Different Chemical Reagents on the Preparation of Activated Carbons from Bituminous Coal"; Fuel Processing Technology 64 (2000), pp. 155-166.

U.S. Customs Laboratory, USCL 38-15RO, "Activated Carbon and Activated Natural Mineral Products"; Apr. 2001; pp. 1-5.

Walker, P.L. and Amargo, A.; "Activation of Pre-Chlorinated Anthracite in Carbon Dioxide and Steam"; Carbon 1995; pp. 239-241.

Classification of Coal; www.engineeringtoolbox.com (2011).

\* cited by examiner

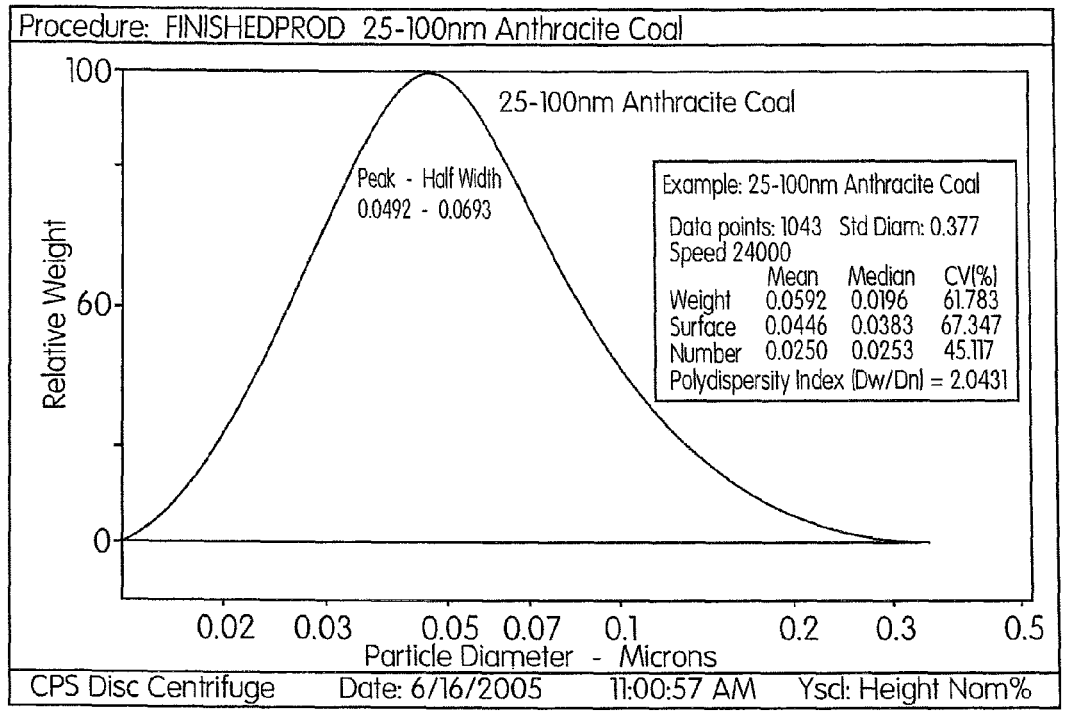

Sample Identification: 25-100 nm Anthracite Coal

Date Time of Analysis: 6/10/2005 11:00:57 AM

****************** Distribution and Graph Data ******************
Disc Speed: 24000 RPM
Cal. Standard Diameter: 0.377 Microns
Cal. Standard Density: 1.385 g/ml
Particle Density: 13.51 g/ml
Fluid Density: 1.055 g/ml
Number of Data Points: 1043
Analysis Time: 16.85 Minutes
Total Weight: 151.51 Micrograms
Offset: None
Noise Filtration: None
Peak Detection Factors: Height =0.5 Width = 0.5
Detected Peaks: 0.0492 microns

********************** Distribution Statistics **********************
Oversize Percentiles
       1%     5%     10%    25%    50%    75%    90%    95%    99%
Weight = 0.2008 0.1322 0.1030 0.0714 0.0495 0.0352 0.0250 0.0220 0.0170
Median = 0.0495  Mean = 0.0592  CV = 61.75

FIG. 3

| | Moisture | ASH | Fixed Carbon | Volatile Matter |
|---|---|---|---|---|
| # 9µ | 3.0 | 10.6 | 84.3 | 5.0 |
| # 18 5µ | 1.1 | 4.2 | 91.6 | 4.1 |
| # 37µ | 0.9 | 5.0 | 90.6 | 4.4 |
| # 0.0625 | 6.68 | 0.3 | 75.61 | 22.48 |

Chemical Characteristics

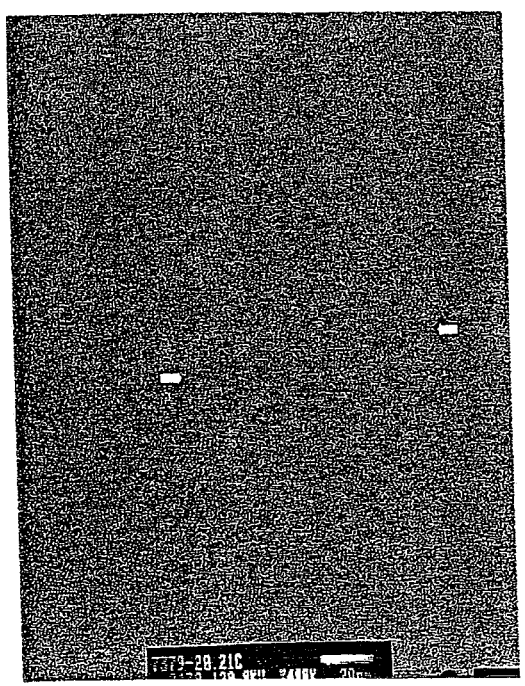 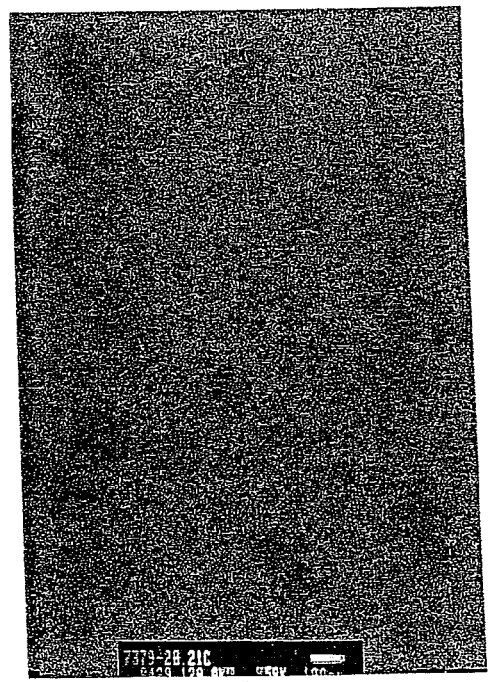
(a)          (b)
FIG. 8

| LOT CERTIFICATION | | | | | |
|---|---|---|---|---|---|
| Sample(s) | Quantity: | gram: | Shipment: Quantity: | | gram: |
| 1.0 - CHEMICAL ANALYSIS | | | | | |
| 1.1 - PROXIMATE (db) | | | | | |
|  | Weight % | Remarks ASTM | | | |
| ASH | 5.952 | ASTM | D-1542-02 | | Auto Method |
| VOLATILE | 4.184 | ASTM | D-1542-02 | | Auto Method |
| FIXED CARBON | 89.864 | ASTM | D-1542-02 | | Auto Method |
| SULFUR | Not Tested | ASTM | D-1542-02 | | Auto Method |
| 2.0 - CHEMICAL PROPERTIES | | | | | |
| 2.1 - Concentration of Anions | | | | | |
| Technique | | | | | |
| Electrical Conductivity Determination | | | | | X |
| Customer Specification No. | | | | | |

| Property |  | Grit Size Range | Max. Value | Tolerance | Units |
|---|---|---|---|---|---|
| Electrical Conductivity |  |  | 1.0 | n.a. |  |
| Electrical Conductivity Data | | | | | |
| Property |  | Technique | Value | Tolerance | Units |
| Electrical Conductivity |  |  |  |  |  |
| According to Customer Specification: | | | YES | X | NO |
| 3.0 - PHYSICAL PROPERTIES | | | | | |
| Particle Size Distribution | | | | | |
| Technique / Equipment | | | | | |
| Equivalent Volume / Coulter | | X | Equivalent Volume / UPA | | |
| Equivalent Volume / X-100 | | | Equivalent Volume / SPA | | |
| Customer Specification No. | | | | | |

| Product Designation | Mean Size | St. Dev. | Particle Distribution | | | | |
|---|---|---|---|---|---|---|---|
|  |  |  | <10% | <25% | <50% | <75% | <90% |
| #5.0 (3-7μ) | 5.0 | TBD |  |  |  |  |  |
| Results: Attached PSD Data (Chart) | | | | | | | |
| Product Designation | Mean Size | St. Dev. | Particle Distribution | | | | |
|  |  |  | <10% | <25% | <50% | <75% | <90% |
| #5.0 (3-7μ) | 4.665 | 1.588 | 2.461 μm | 3.552 μm | 4.812 μm | 5.806 μm | 6.563 μm |

| Customer Specification No. | | | | |
|---|---|---|---|---|
| 1.2 - Bulk Density | | | | |
| Technique | | | | |
| Bulk Density Test | | | | |
| Results | | | | |
| Property | | Value | Tolerance | Units |
| Bulk Density Test | | | | |
| According to Customer Specification: | | YES | X | NO |

FIG. 9

| PRODUCT CERTIFICATION | | | | | | | |
|---|---|---|---|---|---|---|---|
| Product Designation | | | Product #5.0 (3-7μ) | | | | |
| 1.0 - CHEMICAL ANALYSIS | Cl | 1300 | F | nd | | Hg | nd |
| 1.1 PROXIMATE (db) | Sb | Nd | SE | nd | | | |
| 6.0 ASH FUSION | | | | | | | |
| LD=2800+ | | Weight % | Remarks ASTM | | # | | °F |
| LD=2800+ | ASH | 5.952 | ASTM | | D-1542-02 | | Auto Method |
| | VOLATILE | 4.184 | ASTM | | D-1542-02 | | Auto Method |
| | FIXED CARBON | 89.864 | ASTM | | D-1542-02 | | Auto Method |
| | SULFUR | Not Tested | ASTM | | D-4239-02 | | Auto Method |
| 1.2 ULTIMATE (db) | | | | | | | |
| | | Weight % | Remarks ASTM | | # | | |
| | C | 87.00 | ASTM | | | | |
| | H | 1.96 | ASTM | | | | |
| | N | 0.90 | ASTM | | | | |
| | S | 0.59 | ASTM | | | | |
| | O | 1.30 | ASTM | | | | |
| 1.3 MOISTURE | | | | | | | |
| | | Weight % | Remarks ASTM | | # | | |
| | H2O TOTAL | ASTM | ASTM | | | | |
| 2.0 - ASH COMPOSITION | | | | | | | |
| | Weight % | Remarks ASTM | # | | Weight % | Remarks ASTM | # |
| SiO2 | 57.50 | ASTM | | MgO | 1.32 | ASTM | |
| Al2O3 | 28.86 | ASTM | | Na2O | 0.29 | ASTM | |
| Fe2O3 | 5.87 | ASTM | | K2O | 2.70 | ASTM | |
| TiO2 | 1.77 | ASTM | | P2O5 | 0.19 | ASTM | |
| CaO | 0.94 | ASTM | | SO3 | 0.70 | ASTM | |
| 3.0 - MACERAL GROUPS | | | | | | | |
| | VOLUME % | Remarks ASTM | # | | VOLUME % | Remarks ASTM | # |
| Vitrinite | 77.20 | ASTM | | Micrinite | 0.00 | ASTM | |
| P. Vitrinite | 0.00 | ASTM | | Sclerotin | 0.00 | ASTM | |
| Fusinite | 1.80 | ASTM | | Sporimite | 0.00 | ASTM | |
| Semi-Fusi | 7.50 | ASTM | | Resinite | 0.00 | ASTM | |
| Macrinite | 0.20 | ASTM | | Cutinite | 0.00 | ASTM | |
| 4.0 - REFLECTANCE | | | | | | | |
| | VITRINITE | | MEAN-AVG=5.74 | HIGH-AVG=6.63 | | LOW-AVG=4.44 | |
| 5.0 - ELEMENTAL | | | | | | | |
| | Element | Ppm | Element | Ppm | | Element | Ppm |
| | Ag | Nd | Ge | nd | | Sn | nd |
| | B | Nd | La | nd | | Sr | 82 |
| | Ba | 261 | Li | nd | | Th | nd |
| | Be | 1.4 | Mn | 123 | | U | 123 |
| | Bi | Nd | Mo | nd | | V | 58 |
| | Ce | Nd | Nb | nd | | Y | nd |
| | Co | Nd | Ni | 21 | | Yb | nd |
| | Cr | 41 | Pb | nd | | Zn | 27 |
| | Cu | 27 | Rb | 31 | | Zr | 72 |
| | Ga | Nd | Sc | nd | | | |
| | As | Nd | Br | nd | | Cd | nd |

FIG. 10

METHOD AND PROCESS FOR PROVIDING A CONTROLLED BATCH OF MICROMETER-SIZED OR NANOMETER-SIZED COAL MATERIAL

CROSS REFERENCE TO RELATED APPLICATIONS

This application is a continuation application of U.S. application Ser. No. 12/724,538, filed Mar. 16, 2010, which is a continuation application of U.S. application Ser. No. 12/140,787, filed Jun. 17, 2008, and issued on May 4, 201 as U.S. Pat. No. 7,708,213, which is a continuation application of U.S. application Ser. No. 11/318,262, filed Dec. 23, 2005 and issued on Aug. 5, 2008 as U.S. Pat. No. 7,407,121, and claims priority from U.S. Provisional Patent Application Ser. Nos. 60/639,498, filed Dec. 28, 2004 and 60/691,526, filed Jun. 17, 2005, which are all incorporated herein by reference in their entirety.

BACKGROUND OF THE INVENTION

1. Field of the Invention

The present invention relates generally to coal material having a small particle size diameter and, in particular, to a method and process for providing a controlled batch of micrometer-sized or nanometer-sized coal material, which exhibits or demonstrates a specified and desired physical or chemical property within a specified range.

2. Description of Related Art

Coal is composed of a complex, heterogeneous mixture of organic and inorganic components that vary in shape, size, and composition depending on the nature of the vegetation from which they were derived, the environment in which they were deposited, and the chemical and physical processes that occurred after burial. As illustrated in Table 2, and according to the prior art, finely sized or pulverized anthracite and other coals are being used in fuel and non-fuel applications, including applications that use these coal materials as precursor particles for the production of high value-added carbon products. These carbon products, however, have minimal or no requirements directed to the exact physical and chemical properties, such as: (1) Particle Size and Distribution (PSD); (2) Particle Shape; (3) Specific Surface Area; and (4) Bulk Purity. Such application needs have been met with little or no success through the prior art coals offered.

TABLE 1

United States Sieve Series and Tyler Equivalents

| U.S. Sieve No. Designation | Tyler Sieve No. Designation | Inches | mm |
|---|---|---|---|
| No. 4 | 4 Mesh | 0.185 | 4.699 |
| No. 8 | 8 Mesh | 0.093 | 2.362 |
| No. 10 | 9 Mesh | 0.0787 | 2.0 |
| No. 12 | 10 Mesh | 0.065 | 1.651 |
| No. 14 | 12 Mesh | 0.0555 | 1.4 |
| No. 16 | 14 Mesh | 0.046 | 1.168 |
| No. 20 | 20 Mesh | 0.0328 | 0.833 |
| No. 30 | 28 Mesh | 0.0232 | 0.589 |
| No. 40 | 35 Mesh | 0.0164 | 0.417 |

Prior art powdered coal materials are being produced and applied with physical dimensions based only on a top size (and infrequently, a bottom size) specification in the mesh size region. The particle size of granular and powdered carbon is typically described by the mesh size through which it can pass. Industry standards use the United States Sieve designation to denote particle size, and the two sieve sizes describe the maximum percentage size and minimum percentage size of the bulk of the material. See Table 1. For example, an activated carbon sized 8×30 contains granules that pass a No. 8 sieve, but not a No. 30 sieve. A 3 mm pellet corresponds to 4×8 granules, while 4 mm pellets correspond to 4×6 granules.

Currently, pulverized coals are only described by the top mesh sieve through which it can pass, for example a "70% minus 200 Mesh (74µ)" designation is used to describe a powder which 70% passes through a Tyler sieve marked 200 mesh, therefore placing negligible restrictions on the number or volume of finest and coarsest particles within the distribution. Such a designation and composition is illustrated in Table 2.

TABLE 2

Average Analysis of Pulverized, Impounded and CWSF Coal Materials

| PC, Feedstock and CWSF Parameters | PC | Impounded Coal Fines | CWSF Day 1 | CWSF Day 2 |
|---|---|---|---|---|
| Moisture (As Received)[b] | 1.6 | N.A.[a] | 52.1 | 51.2 |
| Ash | 14.2 | 41.3 | 9.9 | 9.9 |
| Volatile Matter | 22.6 | 22.1 | 29.1 | 29.3 |
| Fixed Carbon | 63.2 | 36.6 | 61.1 | 60.8 |
| Carbon | 74.6 | 48.7 | 77.6 | 77.6 |
| Hydrogen | 4.3 | 3.4 | 4.7 | 4.7 |
| Nitrogen | 1.3 | 0.9 | 1.3 | 1.3 |
| Sulfur | 1.7 | 1.1 | 1.4 | 1.4 |
| Oxygen | 3.9 | 4.6 | 5.2 | 5.2 |
| Higher Heating Value (Btu/lb) | 12,737 | 7,554 | 13,486 | 13,487 |
| Solids Loading (wt. %)[c] | N.A. | N.A. | 47.9 | 48.8 |
| Apparent Viscosity (@ 100 s$^{-1}$)[d] | N.A. | N.A. | 80 | 99 |
| pH[e] | N.A. | N.A. | 6.8 | 6.5 |
| Particle size Distribution (µm)[f] | | | | |
| 99.8% passing | 190-245 | 190 | 254 | 293 |
| D(v, 0.9) | 79-105 | 87 | 117 | 142 |
| D(v, 0.5) | 31-39 | 16 | 29 | 30 |
| D(v, 0.1) | 7-8 | 3 | 6 | 6 |

[a]Not applicable
[b]All values reported on a weight %, dry basis unless noted otherwise.
[c]Determined using an AVC-80 CEM Microwave Moisture Analyzer
[d]Determined using a Bohlin Visco 88BV Viscometer
[e]Determined using an Orion Model 420A pH Meter
[f]Determined using a Malvern Series 2600C Droplet and Particle Sizer From: Bruce G. Miller, Sharon F. Miller, Joel L. Morrison, and Alan W Scaroni (1997)

Another property to be considered with respect to coal materials is the surface area of the particles. Many of the most popular methods for determining the surface area of powders and porous materials depend on the measurement of adsorption. It was the advent of gas adsorption for surface area determination that had replaced the practice of radioactive indicators and dye adsorption. The first significant advances in the development of gas adsorption technique were made by Brunauer and Emmett, and their work paved the way for the development of the Brunauer-Emmett-Teller (BET) theory in 1938.

Yet another property to be considered is bulk purity, a global property for a population of particles. Bulk purity represents the absence of non-coal or carbon material extrinsic of the particle. Extrinsic impurities may be either organic or inorganic in nature, and their origin may have been from the incoming feed material or during processing and handling.

Traditionally, measurements have been performed in order to rank different coal types. Primarily these measurements were taken to ascertain moisture, volatile matter, fixed carbon, ash and heating value of the subject material. Today, detailed chemical composition measurements can help to design feed material blends for both fuel and non-fuel uses such as Syn-Gas generation, activated carbons, and precursor materials for high value carbon materials such as molded or extruded graphite, binder pitch, ultra-capacitors, etc.

Current art classifies coals according to degree of coalification. The degree of coalification changes depending on factors of pressure, heat and time. As a result, various kinds of coals are generated. These coals have specific properties and are classified for their effective use by rank, a measure of the degree of coalification. In the United States, the American Society for Testing and Materials (ASTM) classifies coal into four classes: lignite, sub-bituminous, bituminous and anthracite.

Table 2 represents the proximate and ultimate analysis of pulverized coal material, and further illustrates the limited information currently required to classify coals. However, this type of information, including the coal's heating value, serves as an adequate yardstick for comparing pulverized materials for fuel use applications only.

For the purposes of this description, and as is known in the art, activated anthracite is also considered activated carbon, such as activated charcoal; active carbon; active charcoal; amorphous carbon; bone black; bone coal; channel black; charcoal; decolorizing carbon; lamp black, etc. Activated carbon is a form of carbon arranged in a quasi-graphitic form and having a small particle size. In particular, this material is a solid, porous, black carbonaceous material and is tasteless. Further, activated carbon is distinguished from elemental carbon by the presence of non-carbon impurities and the oxidation of the carbon surface.

Activated carbon is manufactured in a variety of processes. According to the prior art, activated carbon can be prepared from a large number of sources by a wide variety of methods. The Merck Index divides these into four basic forms: Animal charcoal is obtained by charring bones, meat, blood, etc.; Gas black, furnace black, or channel black is obtained by the incomplete combustion of natural gas; Lamp black is obtained by burning various fats, oils, resins, etc., and Activated charcoal is prepared from wood and vegetables. Activated carbon can be produced from a number of agricultural commodities, such as hardwoods, grain hulls, corn cobs, and nut shells. Steam activation can also be used with food-grade carbonaceous material.

The activation process may also employ an acid treatment. For example, pecan shells can be activated by treatment with hydrochloric acid, then heated in an electric furnace for four hours at 800-1,000° C. in an atmosphere of carbon dioxide. Among the other raw materials used as precursors to make activated carbon are sawdust, peat, lignite, coal, cellulose residues, petroleum coke, spent ion exchange resins, such as styrene-divinyl benzene polymers and phenol-formaldehyde resins, old automobile tires and sewage sludge. Various binding agents may be added to improve the structure. Commercial sources appear to be made from a variety of precursors, activating agents, and binders.

Any given carbon sources may be prepared, treated or manufactured by a wide variety of methods. These may or may not involve synthetic acids, bases, and other substances in a stream of activating gases such as steam ($H_2O$), nitrogen ($N_2$) or carbon dioxide ($CO_2$). Yields and quality can be improved by the removal of moisture. Microwaves can be used to pyrolize the carbon source. Lignite and peat are made into activated charcoal by low-temperature charring, followed by treatment with either superheated steam or potassium hydroxide. Carbon can be made into a cation-exchange resin by sulfonation, or by nitration and reduction, and treatment of low-rank coal with ethylene dichloride and ammonia makes activated carbon an anion exchange resin. Some processes treat carbonaceous matter with phosphoric acid and/or zinc chloride, with the resulting mixture carbonized at an elevated temperature, followed by the removal of the chemical activating agent by water washing. Some activated carbon can be recycled, reactivated, or regenerated from spent activated carbon.

Activated carbon may be used in a variety of specialized applications, for example: as a decolorizing agent; a taste- and odor-removing agent; and a purification agent in food processing. Food and beverage production accounts for only about 6% of the market for liquid-phase activated carbon. Of this, the greatest use is decoloring sugar. More recent applications have enabled the production of xylose and its derivatives from complex cellulose sources via fermentation and activated charcoal. Activated carbon remains the most common method used to de-color vinegar, and can also be used to remove ethylene from fruit storage facilities, particularly if brominated.

The primary use for activated carbon is the treatment of water, including potable water (24% of all use); wastewater (21%) and groundwater remediation (4%), which accounts for approximately half of all the use in the United States. These are indirectly related to organic production, because disinfected water filtered through activated carbon is a common food ingredient. Non-agricultural ingredients, such as enzymes, are also often purified by the use of activated carbon. Both can result in products processed by activated charcoal used to process food and beverages.

Activated charcoal also has non-food uses related to the production and consumption of agricultural commodities. For example, activated charcoal is used to filter tobacco smoke. There are also a number of applications related to purification in the clothing, textile, personal care, cosmetics, and pharmaceutical industries. Activated carbon also has a broad range of applications outside of food processing, such as in veterinary and analogous medical applications, such as detoxification. Activated charcoal is used in agriculture as a soil amendment (e.g., alkali-treated humates and humic acid derivatives), and as a component of nursery or transplant media, as well as to remove pesticide residues. Among the literally hundreds of other uses are agents in gas masks, pollution control devices such as car catalytic converters and flue gas desulfurization.

Referring now to the chemistry of activated carbon, it should be noted that activated carbon has an extraordinarily large surface area and pore volume that gives it a unique adsorption capacity. Some material includes particles having surface areas as high as 5,000 m2/g. The specific mode of action is extremely complex, and has been the subject of much study and debate. Activated carbon has both chemical and physical effects on substances where it is used as a treatment agent. Activity can be separated into: (1) adsorption; (2) mechanical filtration; (3) ion exchange; and (4) surface oxidation.

Adsorption is the most studied of these properties in activated carbon. This action can be either physical or chemical in nature, and frequently involves both. Physical adsorption involves the attraction by electrical charge differences between the adsorbent and the adsorbate. Chemical adsorption is the product of a reaction between the adsorbent and the adsorbate. Adsorption capacity depends upon: (1) physical and chemical characteristics of the adsorbent (carbon); (2) physical and chemical characteristics of the adsorbate; (3) concentration of the adsorbate in liquid solution; (4) characteristics of the liquid phase (e.g., pH, temperature); and (5) amount of time the adsorbate is in contact with the adsorbent (residence time).

Mechanical filtration involves the physical separation of suspended solids from a liquid passing through carbon arrayed as a porous media in a column or bed. Any finely divided solid, such as sand or cellulose, can accomplish this. While this accounts for some of the clarification properties of carbon, it is seldom the sole reason for the selection of carbon as a clarification medium. The effectiveness of filtration depends on particle size, bulk density, and hardness. While a smaller particle size results in a clearer liquid, it also slows the speed of processing. Bulk density determines how much carbon can be contained in a given container. Hardness is relevant, since the particles need to have sufficient strength to block the particulate matter being filtered.

Coal is a natural ion exchanger, and ion exchange can be enhanced by chemical activation. Carbon surfaces have both negative (anionic) or positive (cationic) charges to attract free ions in solution or suspension, depending on how they are treated. Treatment of carbon with a base increases the capacity of carbon to exchange anions; acidulation of the surface makes carbon a powerful cation exchanger. Surface oxidation involves the "chemisorption" (chemical adsorption) of atmospheric oxygen to the carbon and the further reaction of the surface oxides that chemically react with other substances that are oxidized. The surface of activated carbon has an electrical double layer.

The purity of the carbon and other substances found with it depends on the source, the manufacturing process, whether it is a virgin or regenerated source, and formulation. Bone char is generally 9-10% carbon and about 90% ash, with 80% of bone char composed of calcium phosphates. Activated carbon can be combined with a number of other substances that are effective agents for ion exchange. These might include filtering aids, e.g., silicon dioxide, and resins. The carbon is usually packed in a column that is non-reactive, but sometimes columns and other packing material will also provide ion exchange activity. Some of these are ceramic or polymeric. Activated carbon may also be used with a variety of metal catalysts, including nickel, copper, palladium, ruthenium, and titanium. Chlorine is often used with activated carbon to remove phenols and other chemicals.

Carbon can be reused if the adsorbed substances are removed. This process is known as 'regeneration'. Simply heating the spent carbon at a given temperature for an adequate length of time can regenerate activated carbon to the point where it can be reused for tertiary wastewater treatment (thermal regeneration). Thermal regeneration inevitably results in the loss of carbon. Also, thermal methods may not be the most efficient, inexpensive, or reliable method, so a number of solvents, acids, and alkalis may be employed to remove the adsorbed substances. These include such things as carbon tetrachloride, hydrochloric acid, hydrogen peroxide, potassium hydroxide, sodium hydroxide. Optimization of the regeneration process depends on the substances adsorbed as well as the structure of the activated carbon.

Charcoal dates back to the prehistoric discovery of fire. Ancient Hindus filtered their water with charcoal and Scheele discovered the fact that certain types of charcoal had adsorptive capacity, i.e., were chemically 'active' in 1773. Charcoal was found to decolor tartaric acid in 1785. In 1794, charcoal was first applied to the refinement of sugar. Natural forms of activated carbon such as charred animal bones (bone black) were used to refine sugar. Inventors patented a number of methods to improve the clarification, decolorization, and purification power of the bone char. These included improvements in: the control of the heat of carbonization; differential oxidation; mixing of bone with anthracite or bituminous coal; addition of calcium phosphate to carbonized sugar; the packing of various clays upon the bone char in the retorts; complexing with various binders; and acidulation. By 1901, scientists had developed ways to synthesize activated carbon from coal that had equivalent or superior adsorptive and decolorizing capacity to bone black.

According to the prior art, most carbon material can be used to make activated carbon and the academic literature contains many references to activated carbon derived from many agricultural and industrial high-carbon waste products. Commercial activated carbon, however, is manufactured from only a few carbon sources: wood and sawdust, peat, coal, oil products, and nut shells and pits. Wood products and low-grade coal have some original porosity and are easier to activate than dense materials such as anthracite. However, any high carbon material can be activated, and it is generally not possible to discern the original starting material of an activated carbon product.

Activated carbon manufacturing consists of a charring or carbonization step in which most of the non-carbon material (and much of the carbon) is volatilized by pyrolysis (usually between 500 and 750° C.). The weight loss is usually 60% to 70% and much $CO_2$ is volatilized. Coal is usually first pre-oxidized at 150° to 250° C. to prevent the coal from becoming thermoplastic during charring and collapsing the pore structure. The fine pore structure is formed in an activation process. In gas activation, an oxidizing gas, such as $CO_2$ is used at a high temperature to erode pores into the char. In chemical activation, the char is impregnated with a chemical and then fired to high temperatures (usually 800 to 1000° C.). The activating chemical corrodes the carbon to form the pore structure. Chemical activation also alters the carbon surface. Activation chemicals are usually strong acids, bases or corrosives (phosphoric acid, sulfuric acid, KOH, zinc chloride, potassium sulfide, or potassium thiocyanate). After activation, the chemicals are washed out for re-use, and the final pore structure depends on the nature of the starting material and the activation process. Materials with an original pore structure like wood take less processing than more dense and isotropic material like coal or tar. Impurity amounts are usually higher in the less carbon dense materials, however.

The surface chemistry of the activated carbon is strongly influenced by the activation process and subsequent chemical treatment. The surface contains abundant oxygen and hydrogen groups, which can decompose to $CO_2$ and water. Other surface oxide complexes that have been found include phenols, carbonyl, lactone, carboxylic acid, and quinones. The abundance of surface complexes causes activated carbon to be a good absorber of many gases and aqueous chemicals. The non-selective absorption of many chemicals makes activated carbon an excellent absorber in poisoning or environmental contamination. Non-selectivity is less desirable when a specific chemical is to be removed from a process stream. Activated charcoal is impregnated with potassium carbonate for efficient catalytic reduction of $CO_2$ gas, and debittering of citrus peels is mostly accomplished throughout the use of ion exchange resin.

Charcoal is generally considered to be a natural agricultural product. Both charcoal and carbon black form naturally (forest fires), and have been used by man for thousands of years. Activated carbon does not occur naturally. A highly controlled two- or three-stage process is needed to form the high porosity of activated carbon. The activation step also requires either the addition of a synthetic chemical or direct injection of $CO_2$ or $O_2$ during the activation firing. Highly porous activated carbon should be considered synthetic. Bone char results from the destructive distillation of animal bones, and bone char production does not include an activation step. It is more analogous to the leftover material in the destructive distillation of coal to make coal tar.

According to the prior art, the micronization, activation and preparation of carbonaceous materials is known in the art. For example, see U.S. Pat. No. 6,318,649 to Mazurkiewicz; U.S. Pat. No. 6,425,941 to Roodman; U.S. Pat. No. 4,905,918 to Selles et al.; U.S. Pat. No. 5,174,512 to Orlandi; U.S. Pat. No. 5,575,824 to Brown et al.; U.S. Pat. No. 5,732,894 to Sheahan; U.S. Pat. No. 4,045,092 to Keller; U.S. Pat. No. 4,921,831 to Nakai et al.; U.S. Pat. No. 5,151,173 to Vaughn et al.; U.S. Pat. No. 5,880,061 to Yoshino et al.; U.S. Pat. No. 5,071,820 to Quinn et al.; and U.S. Pat. No. 6,064,560 to Hirahara et al. However, there is considerable room in the art for the exploration of additional and beneficial uses of micronized or nanoized, and activated, anthracite as a precursor for further utilization and/or functionalization. Also, according to the prior art, anthracite has been used as a precursor for the production of activated carbon. However, the physical dimension of the anthracite particles used has been in a mesh range with little or no consideration to particle size distribution. The smallest mesh size of carbon to be used for activation referenced in the prior art is 100 mesh (approximately 150 micrometers), and its corresponding minima/maxima range or maxima-only range defined in the greater than 100 micron region.

SUMMARY OF THE INVENTION

Accordingly, it is an object of the present invention to provide a controlled batch of micrometer-sized or nanometer-sized coal material that overcomes the deficiencies of the prior art. It is another object of the present invention to provide a controlled batch of micrometer-sized or nanometer-sized coal material that provides a functionalized and characterized feedstock of controlled coal material for further processing. It is a still further object of the present invention to provide a controlled batch of micrometer-sized or nanometer-sized coal material that is tailored to include a specified physical or chemical parameter within a desired and specified range. It is a further object of the present invention to provide a method, system and apparatus for the utilization of micronized or nanoized, and activated, coal material as a precursor for further utilization and/or functionalization in downstream processes that overcomes the deficiencies of the prior art. It is yet another object of the present invention to provide a method, system and apparatus for the utilization of micronized or nanoized, and activated, coal material as a precursor for further utilization and/or functionalization in downstream processes that provides additional and beneficial properties to these downstream processes.

In one preferred and non-limiting embodiment, the present invention is directed to a method of providing a controlled batch of micrometer-sized or nanometer-sized coal material. This method includes the steps of: (a) specifying at least one desired physical or chemical parameter of the controlled batch of coal material; (b) specifying the desired range of the physical or chemical parameter in the controlled batch of coal material; (c) obtaining a feedstock batch of coal material; and (d) processing a feedstock batch of coal material to obtain the controlled batch of coal material having the at least one specified physical or chemical parameter in the specified range thereof.

In a further preferred and non-limiting embodiment, the present invention is directed to a method of providing a controlled batch of micrometer-sized or nanometer-sized coal material, which includes the steps of: (a) specifying at least one desired physical or chemical parameter of the controlled batch of coal material; (b) specifying the desired range of the physical or chemical parameter in the controlled batch of coal material; (c) obtaining a feedstock batch of micrometer-sized or nanometer-sized coal material; (d) analyzing the feedstock batch of coal material for the at least one desired physical or chemical parameter; and (e) classifying the feedstock batch of coal material to obtain the specified physical or chemical parameter and the specified range of the physical or chemical parameter, to thereby obtain the controlled batch of coal material having the at least one desired physical or chemical parameter in the specified range thereof.

In a still further preferred and non-limiting embodiment, the present invention is directed to a method of providing a controlled batch of micrometer-sized or nanometer-sized coal material, which includes the steps of: (a) specifying at least one desired physical or chemical parameter of the controlled batch of coal material; (b) specifying the desired range of the physical or chemical parameter in the controlled batch of coal material; (c) obtaining a feedstock batch of coal material; and (d) subjecting the feedstock batch of coal material to a particle size reduction process, thereby obtaining the controlled batch of micrometer-sized or nanometer-sized coal material having the at least one desired physical or chemical parameter in the specified range thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 3 is a size distribution report of multiple controlled batches of nanometer-sized coal material produced using a method and process for providing a controlled batch of micrometer-sized or nanometer-sized coal material according to the present invention;

FIG. 8 is a transmission electron microscope image of a controlled batch of nanometer-sized coal material produced using a method and process for providing a controlled batch of micrometer-sized or nanometer-sized coal material according to the present invention;

FIG. 9 is an example lot certification report for a controlled batch of coal material produced using a method and process for providing a controlled batch of micrometer-sized or nanometer-sized coal material according to the present invention; and FIG. 10 is an example product certification report for a controlled batch of coal material produced using a method and process for providing a controlled batch of micrometer-sized or nanometer-sized coal material according to the present invention.

DESCRIPTION OF THE PREFERRED EMBODIMENTS

Figure 1:
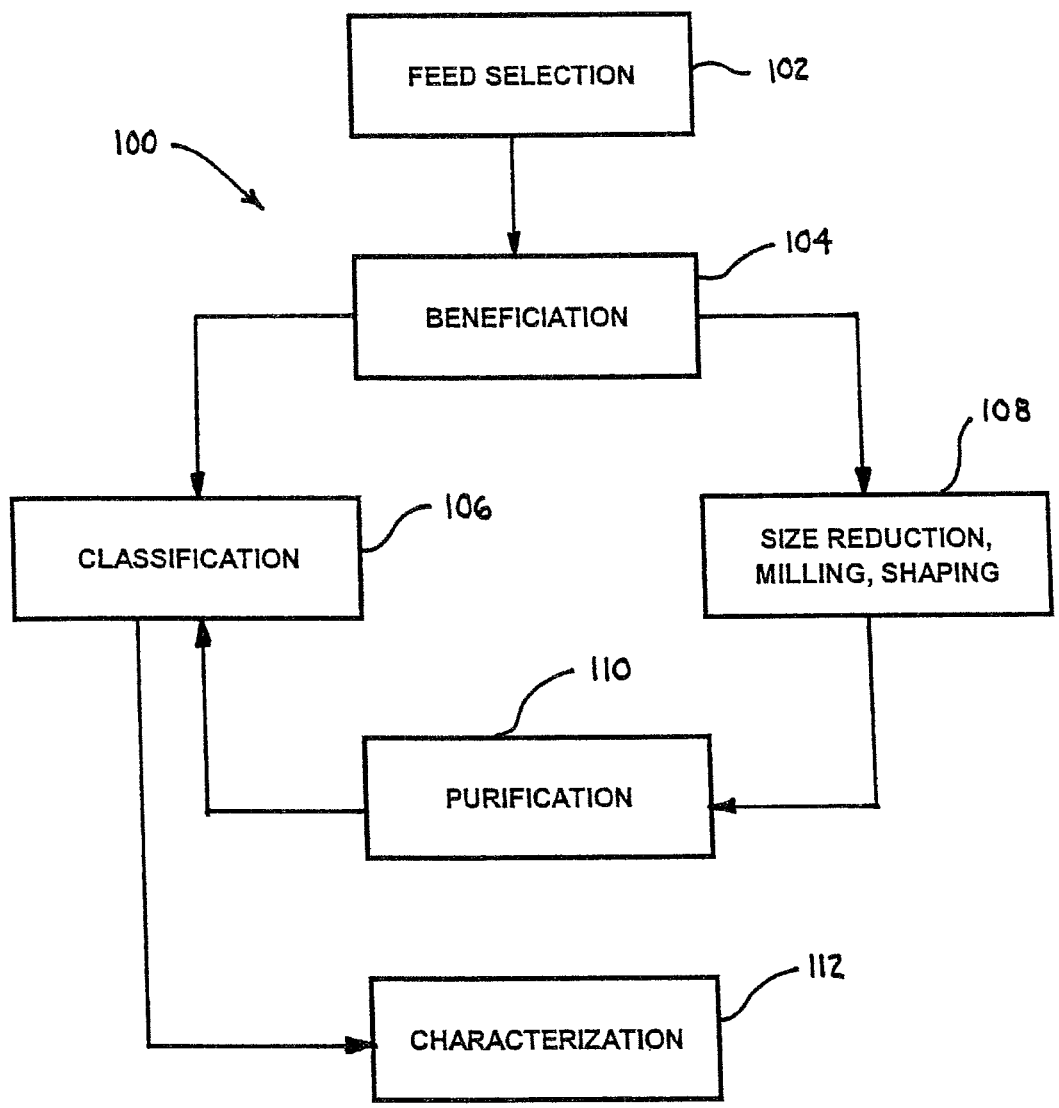
FIG. 1 is a schematic flow diagram of one embodiment of a method and process for providing a controlled batch of micrometer-sized or nanometer-sized coal material according to the present invention.

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention is directed to a unique and novel method of providing a controlled batch of coal material for use in further processing. Specifically, the controlled batch of material is micrometer-sized or nanometer-sized coal material, which may be classified, functionalized or further processed, and thereby exhibits various unique characteristics, such as desired physical and/or chemical properties with certain specified and desired ranges. In addition, the controlled batch of coal material may include multiple and discrete chemical and/or physical properties or parameters, such that the material is tailored to exhibit a precise chemical and physical signature which is verifiable through analysis.

In one preferred and non-limiting embodiment, the present invention provides a method of processing and/or classifying a micrometer-sized or nanometer-sized batch of coal material for use in connection with a variety of downstream processes. In order to obtain this controlled batch of coal material, one or more physical and/or chemical parameter or properties are specified. In addition, the desired range of the physical or chemical parameters in the controlled batch of coal material is specified. Next, a feedstock batch of coal material is obtained, and this feedstock batch of coal material is processed to obtain the controlled batch of coal material having the specified physical and/or chemical parameters in each specified range of the parameter(s). For example, the material could be classified (as discussed in detail hereinafter) to obtain a controlled batch of coal material having particles that are in a certain target size range.

A variety of physical or chemical parameters and properties are envisioned. For example, in one embodiment, the desired physical parameter is particle size distribution, particle mean size, particle median size, particle mode size, particle mean:median ratio, particle top size, particle bottom size or any combination thereof. These parameters allow the specified and tailored ranges of each property to be set forth and, via additional processing, obtained.

In another embodiment, the desired physical parameter is particle shape. In another embodiment, the desired physical parameter is particle surface area, for example, in a specified range of greater than about $2000\,m^2/g$. In yet another embodiment, the desired chemical property is bulk purity, such as chemical composition, an ash content, a sulfur content, a rock concentration, and/or an impurity content, etc.

It is envisioned that the feedstock batch of coal material can be a variety of materials. For example, this feedstock batch of coal material can be waste coal, micrometer-sized coal material, nanometer-sized coal material, pulverized coal material, anthracite, lignite, sub-bituminous, bituminious or any combination thereof. In another embodiment, the feedstock batch of coal material is Buckwheat, Buckwheat No. 4, Buckwheat No. 5, in the range of about 300 micron to about 500 micron, mesh sized, larger than mesh sized or any combination thereof.

The processing of the feedstock batch of coal material to obtain the controlled batch of coal material can be many differing steps, whether enacted alone or in combination. For example, the processing step may include pulverization, micronization, nanozation, classification, characterization, purification, analysis, measurement, further particle size reduction, concentration, constituent removal or reduction, selection, or any combination thereof. For example, in one preferred and non-limiting embodiment, where the feedstock batch of coal material is micrometer-sized or nanometer-sized coal material, the processing step includes determining the at least one physical and/or chemical parameter of at least a portion of the micrometer-sized or nanometer-sized coal material. Once this parameter is determined, the method may preferably include the further step of concentrating the micrometer-sized or nanometer-sized coal material to obtain the desired physical or chemical parameter within the desired range. This concentration step can take many varying forms. For example, the micrometer-sized or nanometer-sized coal material can be concentrated through: (1) gravity separation; (2) froth flocculation; (3) column flotation; (4) selective agglomeration; (5) selective flocculation, or any combination thereof.

In another preferred and non-limiting embodiment, the processing step includes reducing the particle size of the feedstock batch of coal material to a target size region. Size reduction of the feedstock batch of coal material can be achieved through a variety of processing and reduction methods. For example, desired sized reduction may involve the use of: a jaw crusher, a gyrator crusher, a rotary impactor, an autogenous mill, a stamp mill, a roll crusher, a large puck mill, a pan mill, a hammer mill, a rod-loaded tumbling mill, an ultra-rotator, a ring roll or ball mill, a ball-loaded tumbling mill, a vibratory mill, a puck mill, a fluid energy mill, a colloid mill, a horizontal disk mill, a high energy pin mill, a rotary breaker or any combination thereof.

In one preferred and non-limiting embodiment, the processing step includes size reduction and classification. For example, particle size reduction occurs in a fluid bed jet mill. The fluid bed jet mill incorporates dense-phase micronization using turbulent free jets in combination with high efficiency centrifugal air classification within a common housing. This combination allows for enhanced comminution by high probability particle impact for breakage, and a high degree of particle dispersion for improved separation resulting in lower overall energy consumption. Abrasive and temperature sensitive products like anthracite coal and high-volatile bituminous coals can be finely ground with minimum contamination. This simple, easy to clean, cost effective design offers precise top size control with narrow size distributions in the 95%<5 µm to 95%<70 µm size range. Load cells are used to precisely control mill load for optimum grinding efficiency and/or product size distribution control.

In operation, feed is introduced into the common housing through either a double flapper valve or injector. Mill load is formed by flooding the pulverizing zone to a level above the grinding nozzles. Turbulent free jets are used to accelerate the particles for impact and breakage. After impact, the fluid and size reduced particles leave the bed and travel upwards to the centrifugal classifier, where rotor speed will define what size will continue with the fluid through the rotor and which will be rejected back to the particle bed for further size reduction. The high degree of particle dispersion leaving the pulverizing zone aids in the efficient removal of fine particles by the classifier. Operating parameters of rotor speed, nozzle pressure, and bed level allows for optimizing productivity, product size, and distribution shape.

In this embodiment, size reduction occurs via particle-to-particle collision. The benefit is that no heat is generated (as in mechanical milling). High-pressure, air/gas is introduced through specially designed nozzles. Raw materials are introduced into the grinding chamber through a venturi feed injector. The solid particles are entrained in the flow, causing them to collide. These high-velocity collisions pulverize the solids into micron and sub-micron particles. As the particles are reduced to the desired size, the viscous drag of the exhaust draws only the reduced particles into the discharge system.

Air or gas is introduced into the loop through specially designed nozzles. Solid particles are injected into this stream. The high-velocity collisions that result provide thorough and effective pulverization of the feed into smaller particles. The particle stream leaving the reaction chamber flows to the classification zone. As the stream enters the classifier, the direction of the flow is reversed. Properly sized product is entrapped by the exhaust flow and conveyed to collection equipment. Larger particles remain in chamber for further grinding.

Next, in this embodiment, a centrifugal air classifier is utilized to separate fine particles in the less than 75 µm range utilizing the opposed forces of centrifugal and drag in close proximity to a high intensity dispersion mechanism. The classifier incorporates an optimized feed introduction which maximizes the effectiveness of the dispersion forces and minimizes distortion of the particle trajectories within the vortex field. This allows the classifier to achieve a precise, predictable, and extremely sharp separation at a high solids loading.

In operation, the classifier housing serves as a plenum into which the metered primary air is introduced through the inlet duct. This air enters the classifier rotor through the narrow gap between the tip of the two rotor halves and the stator. These opposing high velocity streams form a turbulent dispersing zone. Feed enters the system through the central tube, which is angled to the radial to minimize the distance of coarse particle injection into the vortex due to inertia. The space between the outer edge of the blades and the periphery of the rotor forms the classification zone. Coarse product, which is rejected outward by the centrifugal field, is conveyed out of the classifier through the coarse outlet using a jet pump mounted on a cyclone. The cyclone overflow is returned to the classifier through the recycle port. Fine product leaves the classifier through the central outlet with the primary air flow.

The effectiveness of the particle size reduction can be monitored in process. For example, in this embodiment, monitoring of particle size reduction is performed using laser diffraction; however, there are many other methods available and exercised. This technique can be relatively simple and fast, making such methods ideal for in-process testing. Due to the potential for the formation of loose aggregates during micronization, wet dispersion methods may also be utilized.

When the desired parameter is a chemical parameter, the processing step can include purification of the feedstock batch of coal material and/or purification of the coal material during different points in the inventive process. Such purification can include: (1) a chemical digestion method; (2) a reduction of at least one selected constituent; (3) removal of at least one process contaminant; and/or (4) acid treatment. For example, the acid treatment could be HCL+HF, HCL+HNO$_3$, HF+Boric Acid, HCL, etc.

It is also envisioned that the feedstock batch of coal material can have different particle sizes and shapes. Thereafter, this feedstock batch of coal material is subject to a size reduction processing step, where the coal material is micronized or nanoized to obtain the specified physical and/or chemical parameter within the specified range. In another embodiment, the controlled batch of coal material is activated for use in further applications.

Anthracite coals are known to be highly microporous, but due to the structure, accessing the fine microporosity can be difficult. Accordingly, reducing the particle size of the coal material according to the method of the present invention may open up some of the coal structure. While the novel and innovative process of the present invention may, in one embodiment, produce a controlled batch of micron-sized or nanometer-sized coal material that exhibits various activation characteristics by virtue of size, it is also envisioned that the material can be further processed to obtain additional functionalized properties. As discussed above, the coal material can be "activated" using various known techniques, as discussed hereinafter. The activated coal material can be impregnated (such as with copper, zinc, etc.) to improve performance for a specified application, and to allow the surface of the material to chemically react with a contact material. This impregnation process ensures maximum exposure of the activated coal material to the targeted compound.

Such activation will increase the microporosity of the coal particles, increase the surface area, and add surface functionality. Thereafter, the "activated" coal material can be used in a variety of industrial applications. Coal-based activated carbons contain micropores, mesopores and macropores, and can be used in a wide range of downstream processes. In one preferred and non-limiting embodiment, the coal material is activated through a steaming process or some other chemical process. Prior to activation, the coal material may be processed to reduce the ash content, such as through a mineral acid treatment process. In order to prevent agglomeration of the particles of coal material, the particles may be oxidized, such as at a temperature of 280-375° C.

In one embodiment, the coal material is activated through a steam activation process, wherein, after a gasification reaction step, the material is activated in a steam environment at a temperature of 900-1,100° C. This steam activation may take place in a variety of process vessels, and residence time of the coal material is monitored to achieve effective activation. After activation, the activated material can be further processed to exhibit additional desirous characteristics. For example, the material may be acid-treated to removed certain compounds, minerals and other non-desirous materials. Next, the material can be neutralized, rinsed and dried to provide the final product.

In another embodiment, the coal material is activated using a chemical or catalytic activation process. For example, in a chemical activation process, the material can be impregnated with a dehydrating agent, such as an acid compound, base compound or the like, and subsequently heated (for example, to a temperature of 500-800° C.) to activate the material. The activity and characteristics of the activated coal material is controlled through the reagent type, reagent/material proportions and processing parameters (residence time and temperature). After this activation, and as discussed above, the material may be washed and dried to provide the controlled batch of activated coal material.

After activation of the micron-sized or nanometer-sized coal material, this activated material may be beneficially used in a variety of applications, due to the novel physical and chemical characteristics thereof. For example, through the functionalization of micron-sized or nanometer-sized coal material with specific particle size distribution, one or more of the following properties of the resultant activated carbon can be aided: Reaction Time (chemical); Temperature Required (chemical); Pressure Required (physical); Degree of Purity (chemical); Reactivity (chemical); Amount and Type of Catalysis Needed; Electrical Characteristics; Magnetic Characteristics; Mechanical Characteristics; Thermal Characteristics; Recoveries (effect on yield); Physical Characteristics; Ability to form Crystalline Structure; Amount and Type of Impregnation/Functionalization; Surface Area ($m^2$/g); Pore Volume ($cm^3$/g); Percent Hardness; pH; Percent Ash Content; Percent Fe; Percent Cl; Methylene Blue Decolorizing (ml/g); Percent $CCl_4$ Activity; Selectivity (which material is being captured); Iodine Value (mg/g); Capture Value (mg Captured Material/g Activated Carbon); Distribution Coefficient (amount of metal extracted per g of char/amount of metal unextracted per ml of solution); Ability to Disperse; Desorption Properties; Regeneration Process; Time, Pressure and Temperature for Desorption; etc.

As discussed above, the feedstock batch of coal material is somehow processed to provide the controlled batch of coal material. In one preferred and non-limiting embodiment, this processing step includes: analyzing the feedstock batch of coal material; and classifying the batch of coal material to obtain the specified physical or chemical parameter. In this manner, the controlled batch of coal material will exhibit the physical or chemical parameter in the desired range. The classification step may include a variety of techniques and equipment, such as discussed above.

It is often important for various applications that the controlled batch of coal material be subjected to some scrutiny regarding its constituents. For example, this controlled batch could be processed for use in a specialized application that requires strict adherence to the presence and ranges of the desired physical and/or chemical parameters. Accordingly, the method of the present invention may include the further step of certifying the controlled batch of coal material according to at least one accepted standard.

In another preferred and non-limiting embodiment, the present invention is directed to a method of providing a controlled batch of micrometer-sized or nanometer-sized coal material. In this embodiment, the method includes the steps of: (a) specifying at least one desired physical and/or chemical parameter of the controlled batch of coal material; (b) specifying the desired range of the physical and/or chemical parameter in the controlled batch of coal material; (c) obtaining a feedstock batch of micrometer-sized or nanometer-sized coal material; (d) analyzing the feedstock batch of coal material for the at least one desired physical or chemical parameter; and (e) classifying the feedstock batch of coal material to obtain the specified physical and/or chemical parameter and the specified range of the physical or chemical parameter, to thereby obtain the controlled batch of coal material having the at least one desired physical or chemical parameter in the specified range thereof.

In yet another preferred and non-limiting embodiment, the method of the present invention includes the steps of: (a) specifying at least one desired physical and/or chemical parameter of the controlled batch of coal material; (b) specifying the desired range of the physical and/or chemical parameter in the controlled batch of coal material; (c) obtaining a feedstock batch of coal material; and (d) subjecting the feedstock batch of coal material to a particle size reduction process, thereby obtaining the controlled batch of micrometer-sized or nanometer-sized coal material having the at least one desired physical and/or chemical parameter in the specified range thereof. Once the feedstock batch of coal material is subjected to the particle size reduction process, the controlled batch of reduced-sized (such as micrometer-sized or nanometer-sized) coal material can be classified, characterized or further functionalized or processed.

One preferred and non-limiting embodiment of the presently-invented method (including the various processing steps) is illustrated in FIG. 1 and referred to generally as reference numeral 100. This process flow is not to be considered limiting, but simply an exemplary embodiment of process flow and steps that can be utilized to provide the controlled batch of coal material exhibiting the desired chemical or physical characteristic within the desired range(s). Furthermore, it is envisioned that the feedstock batch of coal material and/or the controlled batch of coal material can be processed or further processed to achieve certain desired physical and/or chemical parameters or properties, some of which are specifically discussed below.

With respect to the embodiment of FIG. 1, the method 100 begins with the step of feed selection 102, wherein the feedstock batch of coal material is selected for further processing. In this step, the selection criteria may include the acquisition of the generally preferred physical or chemical properties, of which the desired chemical or physical parameter in the desired range is a subset. Furthermore, the feedstock batch of coal material may be selected by rank, type of coal material or other identifiable initially-exhibited properties or parameters.

Next, step 104 includes beneficiation of the feedstock batch of coal material. In this step 104, physical methods could be used to, for example, reduce ash content, sulfur content, rock concentrations, etc. Generally, the feedstock batch of coal material is processed to exhibit certain beneficial characteristics or properties which are desired in the controlled batch of coal material. At this point, the coal material could be subjected to classification step 106, which serves to concentrate the coal material (in its micrometer-sized, nanometer-sized and/or mesh-sized form) to a target mean size or other size-based control parameter.

However, after step 104, it is also envisioned that the coal material could be further processed at step 108, such as by size reduction, further size reduction, milling, shaping, etc. For example, this step 108 could include: (i) bulk size reduction to a target size region; (ii) liberation of specified impurities; and/or (iii) shape modification, etc. After processing step 108, the coal material could be subjected to a purification step 110. This step 110 may include: (i) further reduction of selected constituents; (ii) process contaminant removal; and/or (iii) acid treatment, etc. After the purification step 110, the coal material would move to the classification step 106.

Finally, in this embodiment, the coal material or product is characterized, such as in characterization step 112. In this step 112, the material could be profiled, analyzed, tested, etc., storage, gas separation and storage applications, etc. Accordingly, the processing step may include characterizing the feedstock batch of coal material, or alternatively, the characterization may occur subsequent to an earlier processing step, such as characterizing the controlled batch of coal material.

Particle Size Distribution

The present invention allows the method to be employed to achieve a desired particle size distribution, such as by characterization, size reduction, classification, analysis or other processing steps. Accordingly, in one embodiment, the present invention supplies micrometer-sized and nanometer-sized anthracite and other coal material with a specifically designed particle size distribution, and this controlled batch of coal material may also be processed or characterized to include other physical and/or chemical attributes. Therefore, the effectiveness and performance of the end product will be enhanced for use in further processing and applications.

Figure 2:
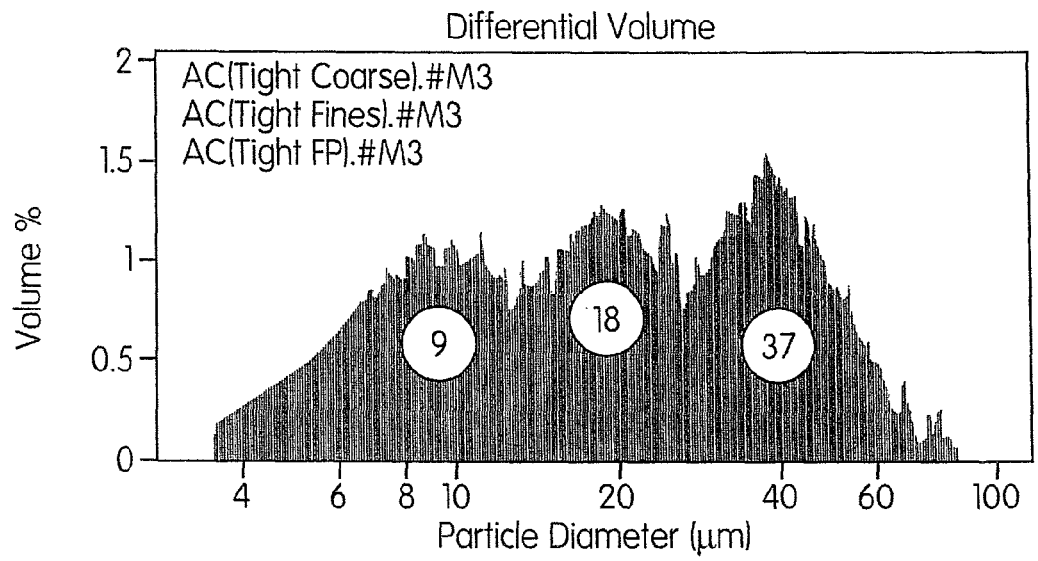
FIG. 2 is a size distribution report of multiple controlled batches of micrometer-sized coal material produced using a method and process for providing a controlled batch of micrometer-sized or nanometer-sized coal material according to the present invention.

As discussed above, the particle sized distribution of the feedstock or controlled batch of coal material can be tailored to produce particle distributions with certain mean size, median size, mode size, mean:median ratio and bottom size. These distributions may be normal or multi-modal, with different degrees of sharpness. Further, the distributions may be additionally defined or characterized by standard deviation, variance, skewness and kurtosis. FIG. 2 illustrates the results of application of the presently-invented method with respect to particle size distribution in the micrometer range. In particular, FIG. 2 is an overlay of three specifically designed and constructed particle size distributions of anthracite coal within a relatively tight overall mean size range spanning 9 to 37 micron. FIG. 3 illustrates the result of application of the presently-invented method with respect to particle size distribution in the nanometer range. The accompanying data for the particle size distribution comparison is set forth in Table 3.

TABLE 3

Particle Size Distribution Comparison

| Product Designation | | | Statistics (micron) | | | | | | | |
|---|---|---|---|---|---|---|---|---|---|---|
| Size | | | | | Mean:Median | Particle Distribution (micron) | | | | |
| (micron) | ID | Batch# | Mean | Std Dev | Ratio | <1% | <5% | <50% | <95% | <99% |
| 9 | C-Micron | 7939-21C | 9.621 | 3.765 | 1.064741 | 3.75 | 4.452 | 9.036 | 16.71 | 20.15 |
| 18 | C-Micron | 7939-21C | 18.16 | 6.536 | 1.023675 | 5.475 | 8.12 | 17.74 | 29.54 | 33.5 |
| 37 | C-Micron | 7939-21C | 37.85 | 13.13 | 1.032742 | 12.56 | 18.44 | 36.65 | 61.78 | 75.93 |
| .0625 | C-Nano | 7939-21.24 | .0592 | — | 1.193548 | 0.0170 | 0.0220 | 0.0496 | 0.1322 | 0.2008 | in order to determine the existence of the desired physical or chemical parameter in the desired range. As discussed throughout the present disclosure, a variety of analytical techniques could be used to locate, monitor, analyze and determine the presence and range of the desired physical or chemical parameter.

The production of most advanced materials begins with powders that are formed into useful objects or components by a variety of thermal, mechanical and chemical processing methods. The resulting properties and performance characteristics of these materials are known to depend significantly on the chemical and physical properties of the starting materials. Consequently, accurate characterization of the starting material is essential to achieving high quality, reproducible production of current materials, and to the development of new materials with optimized or designed properties. For example, the characterized and controlled batch of coal material can be used in connection with energy storage, hydrogen Surface Area As discussed above, another desired physical property can be the surface area of the micrometer-sized or nanometer-sized coal material. Even though the BET method of surface area determination has its drawbacks, it can be utilized in connection with determining specific surface area of the micrometer-sized and nanometer-sized coal materials. In general, the control of the specific surface area of powders or porous materials plays a major role in determining their potential use as an adsorbent material. Typical commercial adsorbent products have BET measured surface areas in the range of 500-2000 $m^2g^{-1}$, but it is technically more demanding to manufacture "super active carbons" with significantly larger BET areas. Specifically, super active carbons (activated carbons with specific surface areas >2,000 $m^2g^{-1}$) require the use of advanced manufacturing methods, including specific surface area control, to achieve these large BET areas.

The measured value of surface area can often be correlated with rates of dissolution and other rate-related phenomena, electrostatic properties of powder, light scattering, opacity, sintering properties, glazing, moisture retention and many other properties which can influence the processing and behavior of powders. Specific surface area impacts the use of micronized and nanometer-sized coals in catalyst applications. High surface area catalysts and catalyst support materials can dramatically influence reactivity over a wide range of chemical processing applications.

Particle Shape

Figure 4:
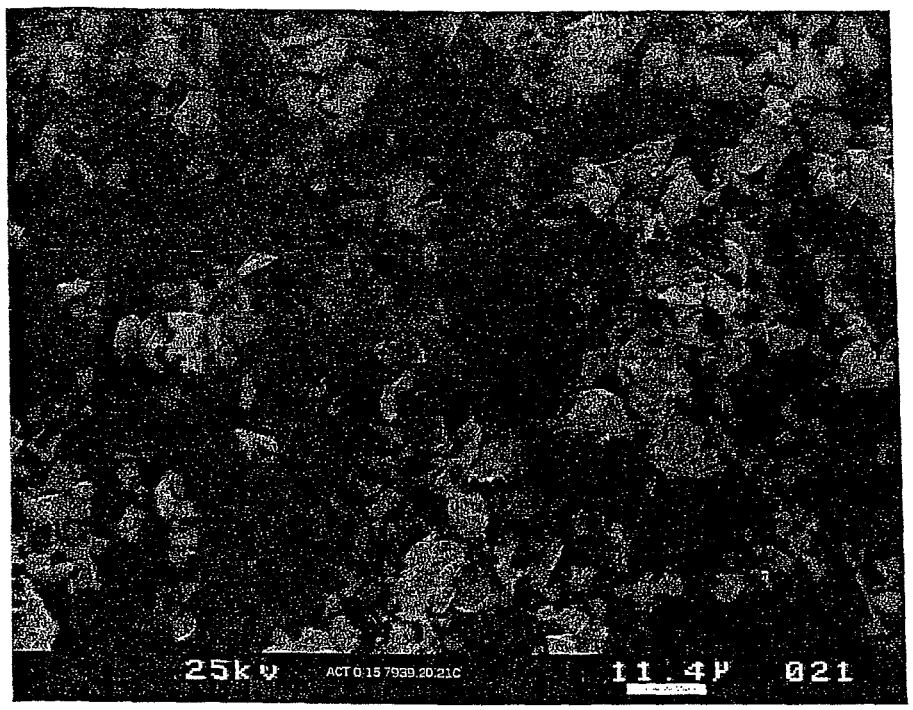
FIG. 4 is a scanning electron micrograph of a controlled batch of micrometer-sized coal material produced using a method and process for providing a controlled batch of micrometer-sized or nanometer-sized coal material according to the present invention.
Figure 5:
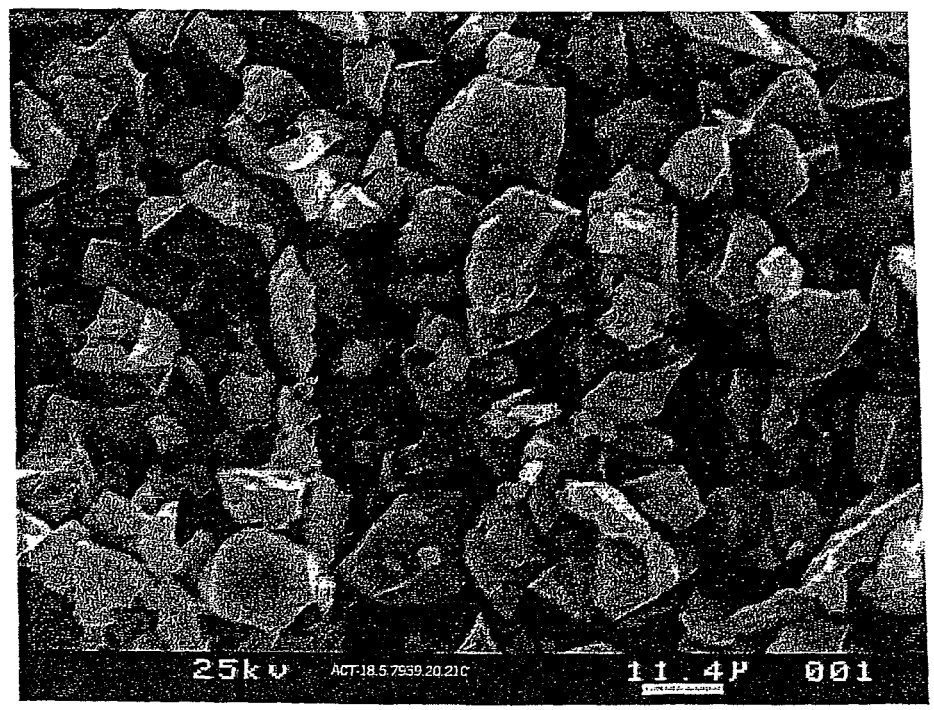
FIG. 5 is a scanning electron micrograph of a further controlled batch of micrometer-sized coal material produced using a method and process for providing a controlled batch of micrometer-sized or nanometer-sized coal material according to the present invention.
Figure 6:
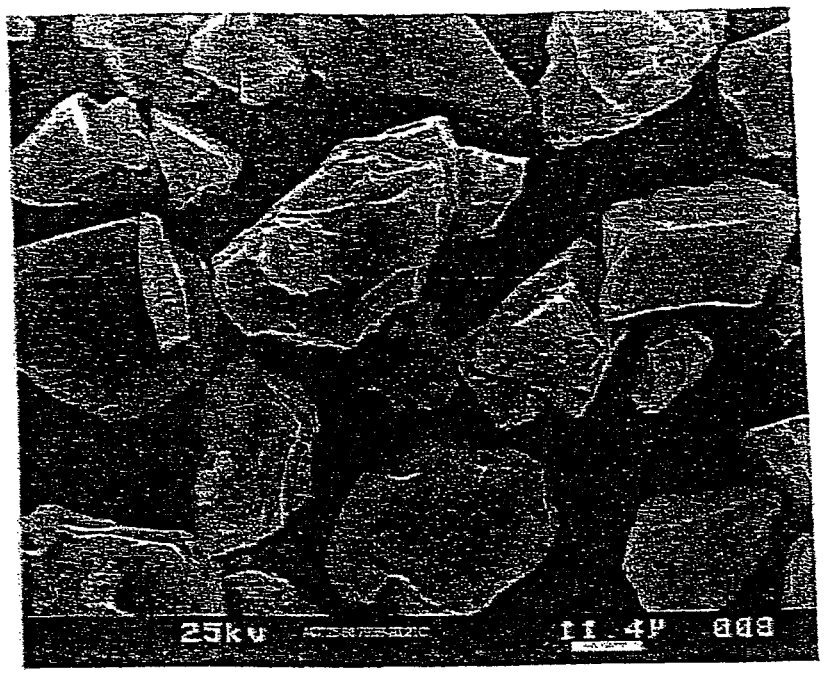
FIG. 6 is a scanning electron micrograph of a still further controlled batch of micrometer-sized coal material produced using a method and process for providing a controlled batch of micrometer-sized or nanometer-sized coal material according to the present invention.

The presently-invented method can be used in connection with obtaining a controlled batch of coal material that exhibits a specifically designed particle shape, which will enhance the effectiveness and performance of the end product. With respect to the prior art, there are presently neither shape requirements nor particle shape standards for pulverized coal. However, the present invention recognizes that particle shape may be an important physical characteristic. For example, this tailored parameter can be used in determining particle-to-particle contact intimacy effecting reaction rates, inter-particle bonding potentials, bulk packing density, etc. Excluding the effect of particle size, particle shape can determine the flow properties of bulk coal powders. FIGS. 4-6 are Scanning Electron Micrographs, respectively, of a batch of #9 Micronized Anthracite Coal, a batch of #18 Micronized Anthracite Coal and a batch of #37 Micronized Anthracite Coal, all of which illustrate particle shape analyses.

Particle Surface Area

Another property that can be controlled and provided using the present methodology is particle surface area. One efficient way to increase the surface area of a material is to decrease its grain size or its particle size. Another way to increase the surface area is to fill the material with voids or empty spaces. Since anthracite and other coals have a significant intra-particle pore structure, in one embodiment, it is beneficial to produce micrometer-sized and nanometer-sized anthracite and other coal material to generate a material with significantly increased surface areas. Thus, these micrometer-sized and nanometer-sized coal materials would make an ideal precursor for applications such as activated carbons, catalyst and catalyst support materials. Further, these coal materials, due to their size, composition and structure, may have "as-is value" in the aforementioned applications, even without further functionalization or processing. The relative abundance and price of coal makes it an ideal raw material for the production of "economic" alternatives for the catalyst, molecular sieve, carbon black, gasification feed, and many other applications, but only in the micron or nanometer-size region. Table 4 illustrates a comparison of certain controlled and specified surface areas achieved using the method of the present invention.

TABLE 4

Comparison of Calculated Surface Area versus Measured Values

| Product Designation | | Specific Surface Area (m²/g) | | |
| --- | --- | --- | --- | --- |
| Product ID | Batch # | Sphere | Cube | Measured |
| #9 C-micron | 7939-21C | 0.392 | 0.486 | 24.54 |
| #18 C-micron | 7939-21C | 0.191 | 0.237 | 13.73 |
| #37 C-micron | 7939-21C | 0.095 | 0.118 | 6.47 |
| #0.0625 C-nano | 7939-21.24 | 59.82 | 74.18 | tbd |

The specific surface area of a sphere-like particle reported in the units of square meters per gram, denoted by the symbol S, for spherical and cubic geometries yield the following expressions:

$$S(r) = \frac{6 \times 10^3}{\rho d} \text{ sphere of diameter } (d)$$

$$S(r) = \frac{6 \times 10^3}{\rho a} \text{ cube of side } (a)$$

Where the length parameters a and d are expressed in nanometers, and the density $\rho$ has the units g/cm³.

Bulk Purity

A further desired parameter may be bulk purity. End product requirements defining bulk purity may vary according to intended end use in further processing. Energy Dispersive or X-Ray Spectroscopy can be used for the detection and qualitative chemical analysis of elements in the periodic table above Beryllium. This technique may be used to qualify incoming feeds, design and control of the size reduction and purification processes and qualification of end product.

Chemical Composition

A still further desired parameter is the chemical composition of the controlled batch of coal material. The analysis of this composition may be incorporated during the feed customization process for determining the concentration of non-metallic and metallic intrinsic impurities. These impurities have been introduced as incoming feeds (pre-existing impurities). The end product requirements will vary according to intended application. Inductively Coupled Plasma-Optical Emission Spectroscopy (ICP-OES) can be used for both the detection and qualitative chemical analysis of at least 70 elements in the periodic table. Feed customization can be utilized to effectively select and identify parent coal materials, which are customized to their chemical (and possible physical) properties specifically selected in order to optimize the desirable characteristics of the resultant products. This may occur following additional size reduction.

Proximate and Ultimate Analysis

Figure 7:
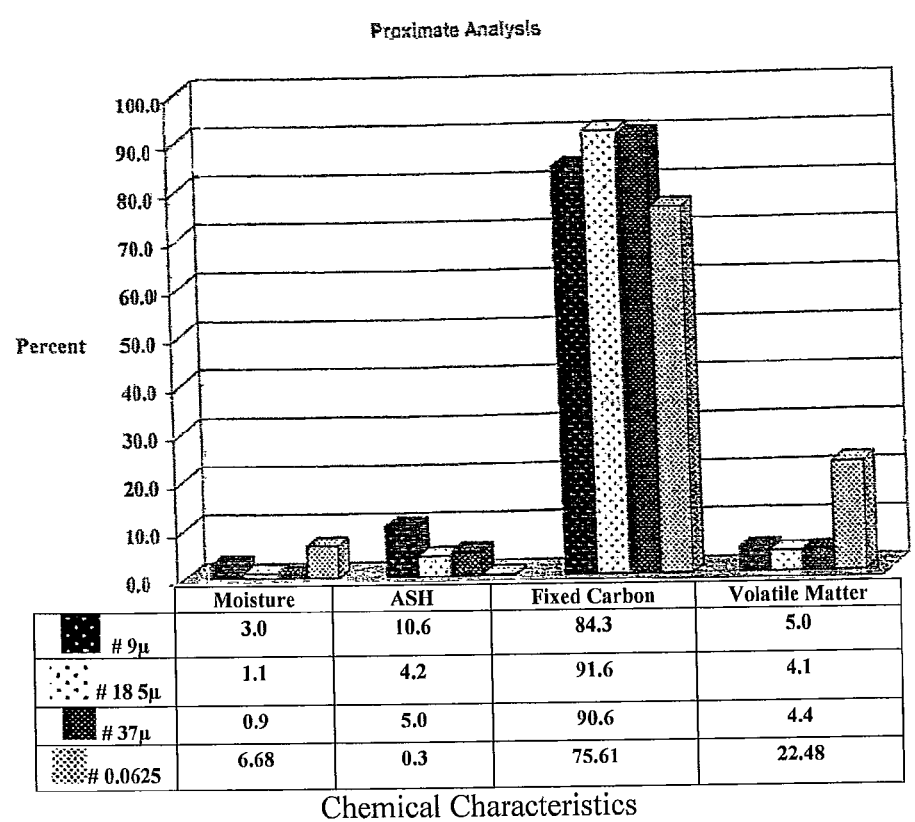
FIG. 7 is a graph of a proximate analysis of a controlled batch of several micrometer-sized and nanometer-sized coal material produced using a method and process for providing a controlled batch of micrometer-sized or nanometer-sized coal material according to the present invention.

The presently-invented method allows for effective and innovative material characterization through a more precise material profile, which will be required by the new material sciences. Today's more sophisticated applications are placing higher performance demands on both fuel and non-fuel uses of coals. Therefore, the requirement of more meaningful chemical information in order to characterize coals for specific application needs is evolving. FIG. 7 clearly indicates that not all micrometer-sized or nanometer-sized coals are the same. For example, an application which is more tolerant of a high ash concentration or requires that specific concentration for maximum catalytic activity would make the #9µ more desirable versus the #18.5µ containing lower ash. It is the ability to control the mean size and ash content, along with particle shape, surface purity, etc. (physical and chemical characteristics) that differentiates these engineered products from conventional pulverized coal products.

Basic information on the nature and origin of particulate material can often be gathered from the size, shape and/or surface form of the individual particles. This type of information can be readily obtained by examining the particles in the scanning electron microscope (SEM). When a sample of particulate material is placed in the electron microscope it is non-destructively bombarded by a finely focused beam (probe) of electrons. As the sample is irradiated by this stream of primary electrons, a variety of interactions occurs with the atoms in the sample. As a result, various forms of radiation are released from the sample which, when detected and processed, can be used to determine its constituent components.

The three types of emitted signals most commonly used in individual particle analysis (IPA) are: secondary electrons, backscattered electrons and characteristic X-rays. The secondary electrons produced by the sample are used routinely to characterize Particle Morphology. These sample electrons are used to create unique, large depth of field, secondary electron images (SEI). The SEI provides information on the size, shape, and surface topography of individual particles ranging in size from <1 micrometer (μm) to >1 millimeter.

For nanometer-sized coal materials and powders, other methods than examination in the SEM are required. Due to the resolution limits of the scanning electron microscope, nanometer-sized anthracite and other coal powders must be observed via the use of Transmission Electron Microscope or TEM. In a transmission electron microscope, the electrons from a source such as an electron gun enter the sample, are scattered as they pass through it, are focused by an objective lens, are amplified by a magnifying lens, and finally produce the desired image. FIG. 8 includes two TEM images which were captured at two different magnifications, both illustrating the fineness of the particle size and distribution achieved in the nano-scale region. These anthracite coal particles are 100 times finer than cigarette smoke.

A variety of analytical methods are envisioned for use in analyzing and determining the existence and/or range of the desired physical or chemical parameter in the controlled batch of coal material. For example, particle size distribution can be determined by a variety of imaging, non-imaging and refraction methodologies, such as sieve analysis, optical microscopy, light scattering, X-ray, electric field, Brownian motion, disk centrifuge, etc. Particle shape determination may occur through shape sorting by mesh-size, SEM for micrometer-sized particles and TEM for nanometer-sized particles. Bulk density may be determined by a Helium pycnometer technique, and specific surface area can be determined by argon or nitrogen BET.

With respect to the chemical parameters, these properties are also determinable through a variety of analytical techniques. For example, the major constituents and concentrations can be determined by proximate analysis, and trace elements can be determined through atomic adsorption, inductively coupled plasma, ultimate analysis, etc. Surface chemistries are determinable by ion chromatography analysis, FTIR, XPS, etc.

Material Certification

As discussed above, based upon the requirements of the end product or application, the present invention also provides for the certification of the controlled batch of coal material. This innovation includes the summary of the micrometer-sized and/or nanometer-sized end product characteristics in the lot. Example lot and product certification sheets are illustrated in FIGS. 9 and 10. FIG. 9 is directed to an example lot certification for #5.0 (3-7μ) Micronized Anthracite Coal Product, and FIG. 10 is an example product certification for the Chemical and Elemental Analysis, Ash and Maceral Composition, of #5.0 (3-7μ) Micronized Anthracite Coal Product. This information may be customized per end product user. New product concepts require contemporary characterization techniques and formats in which to report the data.

Accordingly, the present invention provides novel and innovative methods to provide both micrometer-sized and nanometer-sized anthracite and other coal materials with specific physical and chemical properties to tailor a material response in order to achieve a specific functionality. By controlling the aforementioned properties of these specialized precursor particles, one may produce engineered products which will provide superior performance in designated application areas. Such results can be accomplished through, for example, feed customization (the selection of parent materials customized with respect to chemical and physical properties), size reduction (the size reduction in the micrometer-size and nanometer-size ranges), shape enhancement, classification, purification and characterization of the resultant material.

The present invention provides a controlled batch of micrometer-sized and/or nanometer-sized coal material. Both micrometer-sized and nanometer-sized coal/carbon materials, which are typically on the scale of millionth and billionth of a meter respectively, offer different chemical and physical properties than bulk materials, and have the potential to form the basis of new technologies. The specific interest in micro- and nano-scale materials comes from the fact that their properties (optical, electrical, chemical, etc.) are the functions of their size, composition, and structural order. Anthracite and other coals exhibit some rather unique characteristics which are currently exploited for their bulk properties only. Such materials (bulk form) exist in relative abundance and their use in micrometer and nanometer sizes will present both technical and economic options, for the full spectrum of industries, compared to the materials in use today.

Targeted materials produced from coal, enabled or aided by this invention, include, but are not limited to: metallurgical cokes, activated carbon adsorbents, molecular sieving carbons, graphite and graphite-based materials, Fullerenes or "bucky-balls", carbon nano-tubes, diamond and diamond-like materials, intercalation materials, coal/polymer composites materials, carbon composites, technically complex fuels, coal gasification feedstocks, etc. Targeted materials produced from coal-derived liquids, enabled or aided by this invention, include, but are not limited to: pitch-based carbon fibers, mesocarbon microbeads, carbon electrodes, carbon fiber reinforced plastic, activated carbon fibers, mesophase-based carbon fibers, carbon whiskers or filaments, binder pitches, carbon composites, humic acid derivatives, a variety of hydro-carbon chemicals, glass-like carbons, etc.

By using the comminuting and classifying technique of the present invention, coal material can be micronized or nanoized to produce a precursor with a specified particle size distribution. The precursor can then be applied to the production of numerous carbon-based products, or in additional downstream processes. For example, through the presently-invented method, and through the control of the particle size distribution of the precursor coals, the following properties of carbon-based products can be aided: (1) faster reaction time; (2) lower required activation temperature; (3) lower required pressure; (4) higher degree of purity; (5) enhanced reactivity; (6) enhanced catalyst properties; (7) lower quantity/type of catalysis required for reactions; (8) electrical characteristics; (9) magnetic characteristics; (10) mechanical characteristics; (11) thermal characteristics; (12) chemical characteristics; (13) recoveries; (14) physical characteristics; and (15) ability to form crystalline structures.

Nano-particles are 20 times smaller than the wavelength of visible light. As a result, they will scatter light only to an insignificant extent. Utilizing the methodology of the present invention, an entirely new perspective regarding coal materials for fuel and non-fuel use is realized. The quantum effects of these nano-particles can be utilized for producing innovative materials. As a result of the large surface area created during the processing of nano-particles, new fields of application are unlocked for making catalytic converters, membranes, low-sintering ceramics, etc. The large boundary surface enables polymer nano-composites to be produced with novel properties. On a commercial scale, certain types of nano-particles are currently applied in suntan lotions and for increasing the lightfastness of polymer components. Due to their specific surface area, nano-particles are also widely used as fillers in the paint and printing inks industries.

According to the prior art, ground coal is commonly used as inexpensive filler in rubber compounds as a direct or partial replacement for carbon black or as a diluent. However, particle size will have a direct effect on the modulus tensile strength and tear strength of the finished rubber. Further, ash in the coal will affect the specific gravity and high ash can influence the curing characteristics of the rubber. Moisture in the ground coal at levels of 0.5% and above can cause blisters and scorching. In addition, lowering the density (specific gravity) will reduce compounding cost and affect volume loading. Therefore, the present invention provides a unique method that can replace ground coal with precision micrometer-sized and/or nanometer-sized anthracite, such that better control of the desirable characteristics (which causes enhancement of the end product properties) is obtained.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of providing a controlled batch of micrometer-sized or nanometer-sized coal material, comprising the steps of:
   (a) specifying at least one desired physical and/or chemical parameter of the controlled batch of coal material;
   (b) specifying the desired range of the physical and/or chemical parameter in the controlled batch of coal material;
   (c) obtaining a feedstock batch of coal material; and
   (d) processing the feedstock batch of coal material to obtain the controlled batch of coal material having the at least one specified physical and/or chemical parameter in the specified range thereof by:
      1) introducing the feedstock batch of coal material to a beneficiation step causing elimination of unwanted materials, thereby creating beneficiated material;
      2) subjecting the beneficiated material to a size reduction step, which causes finer sized particles and/or particle shaping in the feedstock batch of coal material, thereby creating size reduced material;
      3) subjecting the size reduced material to a purification step for reducing or eliminating process contaminants and/or newly liberated intrinsic impurities from larger particles, thereby creating purified material;
      4) transferring the purified material to a classification step, which concentrates the particles of the purified material at a targeted mean size, thereby creating classified material; and
      5) transferring the classified material to a characterization step for determining physical and/or chemical properties of the classified material, thereby providing the controlled batch of coal material.

2. The method of claim 1, wherein the feedstock batch of coal material is waste coal, micrometer-sized coal material, nanometer-sized coal material, pulverized coal material, anthracite, lignite, sub-bituminious, bituminious or any combination thereof.

3. The method of claim 1, wherein the feedstock batch of coal material is Buckwheat, Number 4, Number 5, in the range of about 300 micron to about 500 micron, mesh sized, or any combination thereof.

4. The method of claim 1, wherein the feedstock batch of coal material is micrometer-sized or nanometer-sized coal material, and the processing step includes determining the at least one physical or chemical parameter of at least a portion of the micrometer-sized or nanometer-sized coal material.

5. The method of claim 1, wherein the processing step includes the use of: a jaw crusher, a gyrator crusher, a rotary impactor, an autogenous mill, a stamp mill, a roll crusher, a large puck mill, a pan mill, a hammer mill, a rod-loaded tumbling mill, an ultra-rotator, a ring roll or ball mill, a ball-loaded tumbling mill, a vibratory mill, a puck mill, a fluid energy mill, a colloid mill, a horizontal disk mill, a high energy pin mill, or any combination thereof.

6. The method of claim 1, further comprising the step of certifying the controlled batch of coal material according to at least one accepted standard.

7. A method of providing a controlled batch of micrometer-sized or nanometer-sized coal material, comprising the steps of:
   (a) specifying at least one desired physical and/or chemical parameter of the controlled batch of coal material;
   (b) specifying the desired range of the physical and/or chemical parameter in the controlled batch of coal material;
   (c) obtaining a feedstock batch of coal material;
   (d) subjecting the feedstock batch of coal material to a particle size reduction process, which causes finer sized particles and/or particle shaping in the feedstock batch of coal material, thereby creating size reduced material;
   (e) subjecting the size reduced material to a purification step for reducing or eliminating process contaminants and/or newly liberated intrinsic impurities from larger particles, thereby creating purified material;
   (f) transferring the purified material to a classification step, which concentrates the particles of the purified material at a targeted mean size, thereby creating classified material; and
   (g) transferring the classified material to a characterization step for determining physical and/or chemical properties of the classified material, thereby obtaining the controlled batch of micrometer-sized or nanometer-sized coal material having the at least one desired physical and/or chemical parameter in the specified range thereof.

* * * * *

UNITED STATES PATENT AND TRADEMARK OFFICE
CERTIFICATE OF CORRECTION

PATENT NO. : 8,662,427 B2  
APPLICATION NO. : 13/618040  
DATED : March 4, 2014  
INVENTOR(S) : Kevin C. Kerns et al.

Page 1 of 1

It is certified that error appears in the above-identified patent and that said Letters Patent is hereby corrected as shown below:

Title Page, References Cited

Page 2, Column 2, Line 7, delete "Antracite" and insert -- Anthracite --

Page 2, Column 2, Lines 15-16, delete "Desintegration" and insert -- Disintegration --

In the Specification

Column 1, Line 12, delete "May 4, 201" and insert -- May 4, 2010 --

In the Claims

Column 22, Line 8, Claim 2, delete "sub-bituminious, bituminious" and insert -- sub-bituminous, bituminous --

Signed and Sealed this  
Eighth Day of July, 2014

Michelle K. Lee  
*Deputy Director of the United States Patent and Trademark Office*